Figure 2A:
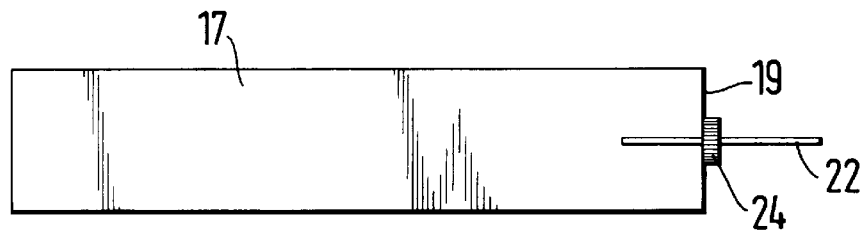

United States Patent [19]
Yeandle et al.

[11] Patent Number: 6,078,711
[45] Date of Patent: Jun. 20, 2000

[54] ATTACHMENT OF AN OPTICAL FIBRE

[75] Inventors: Jonathan Charles Yeandle, Devon; Andrew Cornish, Swindon, both of United Kingdom

[73] Assignee: Bookham Technology Plc, Oxfordshire, United Kingdom

[21] Appl. No.: 09/035,966

[22] Filed: Mar. 6, 1998

[30] Foreign Application Priority Data

Mar. 7, 1997 [GB] United Kingdom .................... 9704726

[51] Int. Cl.⁷ ..................................................... G02B 6/36
[52] U.S. Cl. ............................................................. 385/49
[58] Field of Search ................................. 385/49, 14, 65, 385/83, 99

[56] References Cited

U.S. PATENT DOCUMENTS

| | | | |
|---|---|---|---|
| 4,201,444 | 5/1980 | McCartney et al. | 350/96.21 |
| 4,220,398 | 9/1980 | Dalgoutte | 350/96.21 |
| 4,854,663 | 8/1989 | Borsuk et al. | 350/96.2 |
| 5,499,309 | 3/1996 | Kozuka et al. | 385/38 |
| 5,717,800 | 2/1998 | Funabashi | 385/49 |

FOREIGN PATENT DOCUMENTS

| | | |
|---|---|---|
| 0 072 637 | 2/1983 | European Pat. Off. . |
| 0 271 721 | 6/1988 | European Pat. Off. . |
| 42 17 553 | 12/1993 | Germany . |

OTHER PUBLICATIONS

N. Mekada et al. "Practical method of waveguide–to–fiber connection: direct preparation of waveguide endface by cutting machine and reinforcement using ruby beads," Applied Optics, vol. 29, No. 34, Dec. 1, 1990, pp. 5096–5102.

Hideyuki Takahara et al. "Optical waveguide interconnections for opto–electronic multichip modules," SPIE vol. 1849 Optoelectronic interconnects (1993), pp. 70–78.

*Primary Examiner*—Hung N. Ngo
*Attorney, Agent, or Firm*—Fleshner & Kim, LLP

[57] ABSTRACT

Attachment of an optical fibre (22) to a planar substrate (17) having a major face and an edge surface (14) perpendicular to the major face, the optical fibre (22) being positioned in a groove (18) provided in the major face of the substrate (17) and extending over the edge of the substrate, a mechanical restraint (24) such as a transparent apertured disc being affixed to the edge surface (19) of the substrate, e.g. by a light-cured adhesive (17) to resist movement of the optical fibre (22) in a direction substantially perpendicular to the major face.

11 Claims, 3 Drawing Sheets

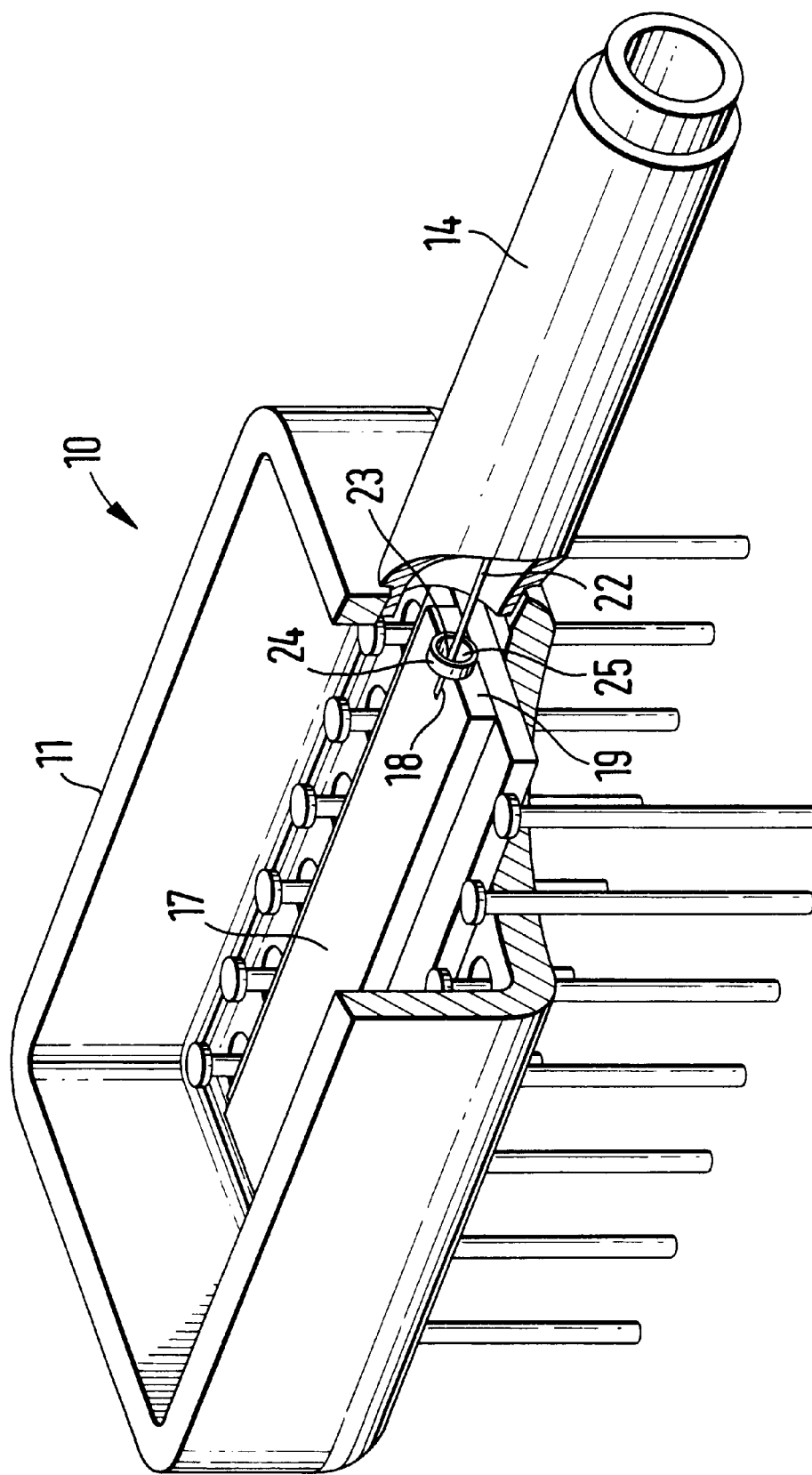

ATTACHMENT OF AN OPTICAL FIBRE

This invention relates to an attachment of an optical fibre to a substantially planar substrate, e.g. the attachment of an optical fibre to a silicon chip carrying an optical circuit.

It is known to attach an optical fibre to an optical chip by positioning it within a V-groove formed on the chip. The fibre may be held in the groove by adhesive or solder which resists axial movement of the fibre within the groove. The fibre is not, however, securely held against forces tending to peel the fibre out of the groove.

It is also known to hold a fibre in a V-groove by means of a mechanical constraint affixed to the face of the chip, e.g. by sandwiching the fibre between the constraint and the chip. However, this requires accurate alignment of the mechanical constraint to ensure it holds the fibre and also to avoid damaging or deforming the fibre. It also tends to be a complex and costly solution to the problem.

It is an object of the present invention to provide an improved attachment for an optical fibre.

In accordance with the present invention there is provided an attachment of an optical fibre to a substantially planar substrate having a major face and an edge surface which is substantially perpendicular to the major face, the optical fibre being positioned within a groove provided in the major face of the substrate and extending over the edge of the substrate, a mechanical restraint being affixed to the edge surface of the substrate to resist movement of the optical fibre in a direction substantially perpendicular to the major face.

Preferably the mechanical restraint is affixed to the edge of the substrate by adhesive.

Preferably the mechanical restraint is affixed to the edge of the substrate by a light-cured adhesive.

Preferably also the mechanical restraint has an aperture through which the optical fibre passes.

Preferably the mechanical restraint is a disc provided with an aperture through which the optical fibre passes.

Preferably further the aperture is provided on a first side of the mechanical restraint facing away from the said edge with a lead-in to facilitate threading of the optical fibre through the aperture.

Preferably a recess is provided in a second side of the mechanical restraint facing the said edge to provide a reservoir for adhesive.

Preferably the mechanical restraint is made of a ceramic, e.g. corundum.

Preferably further the mechanical restraint is transparent.

Conveniently, the mechanical restraint may comprise a watchmaker's jewel.

Other preferred features of the invention will be apparent from the following description and from the subsidiary claims of the specification.

Figure 2B:
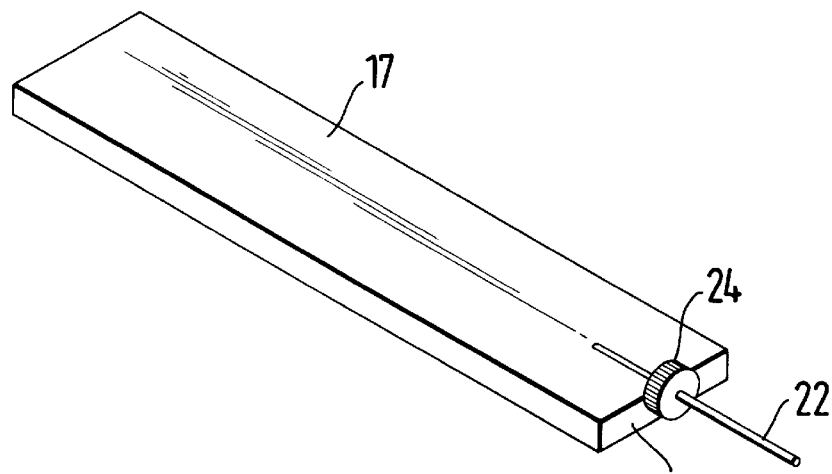
Figure 2C:
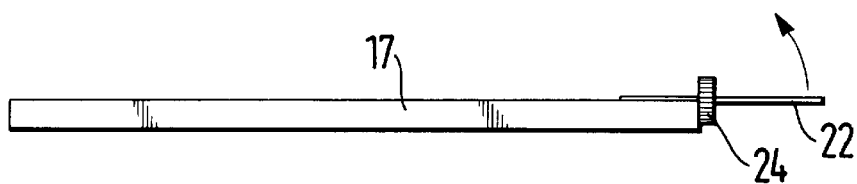
Figure 3:
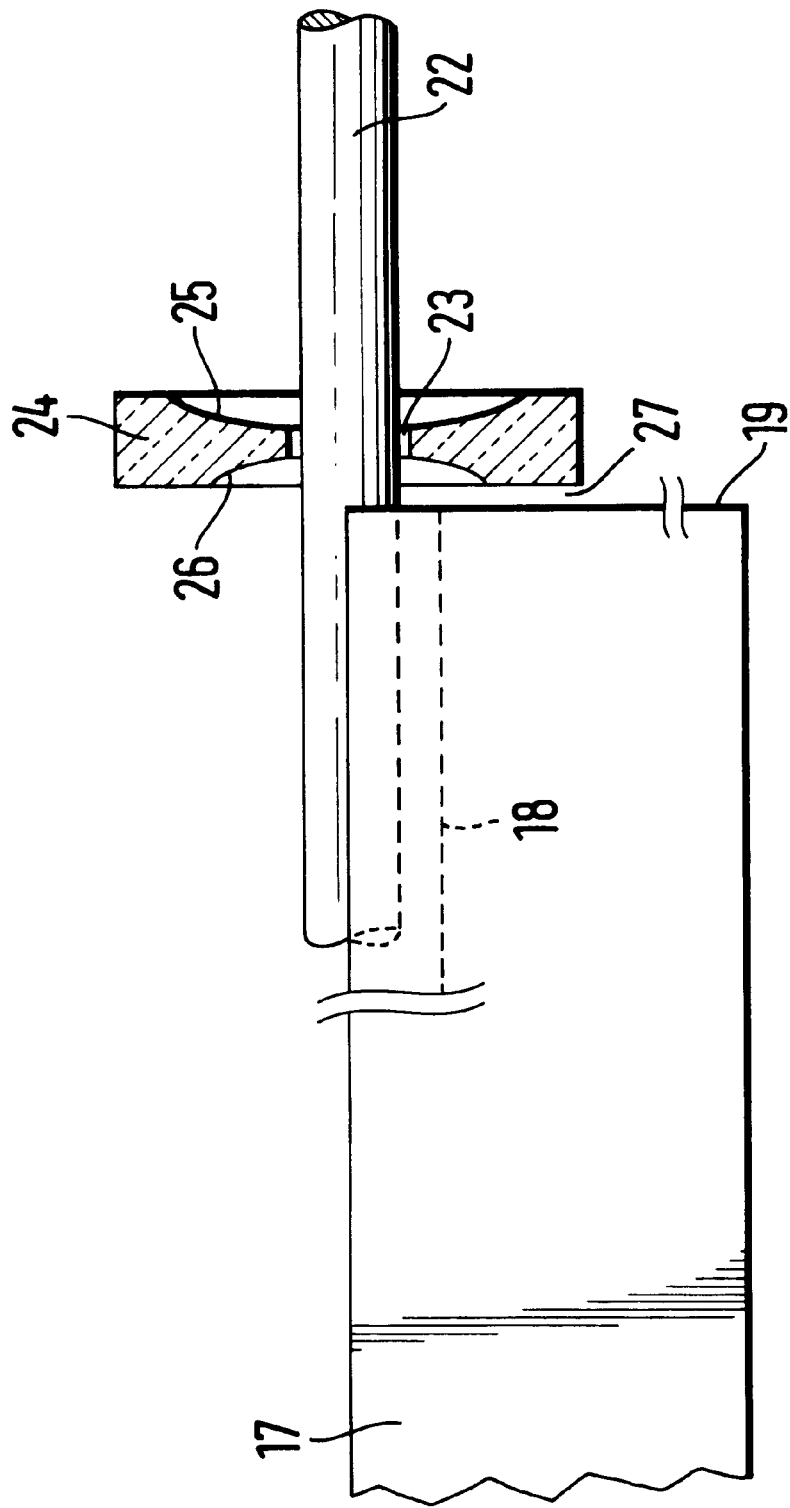

The invention will now be further described, merely by way of example, with reference to the accompanying drawings:

FIG. 1 shows a perspective, partially cut-away view of an optical device containing an attachment for an optical fibre according to an embodiment of the invention FIGS. 2A, 2B and 2C show a plan view, perspective view and side view, respectively, of a schematic diagram of such an attachment; and FIG. 3 is an enlarged, cross-sectional view of the attachment shown in FIGS. 1 and 2.

FIG. 1 shows an optical device 10 having a casing 11. A protective lead-in tube 14 opens into the casing 11 through an orifice in a wall of the casing.

The tube 14 houses an optical fibre 22 which is to be connected to an integrated optical circuit provided on a chip 17 mounted within the casing 11.

The optical fibre 22 is positioned within a V-groove 18 formed in a face of the chip 17 in a conventional manner. The fibre may be secured within the V-groove by adhesive or solder or held in place by other means. The V-groove 18 extends from a position on the chip (from which light is transmitted into and/or out of the optical fibre) to an edge of the chip 17.

The optical fibre 22 is threaded through an aperture 23 in a disc 24 which is affixed to an edge 19 of the chip 17. The disc 24 resists movement of the optical fibre 22 out of or away from the groove 18 in a direction substantially perpendicular to the face of the chip 17.

The disc 24 is affixed to the edge of the chip 17, preferably by means of adhesive or solder.

The adhesive or solder in the V-groove has substantial strength against shear forces, i.e. forces tending to pull the fibre axially out of the V-groove 18, but is relatively weak in tension, i.e. it provides little resistance to forces tending to peel the fibre out of the groove in a direction substantially perpendicular to the face of the chip 17. The disc 24 is, however, affixed to the edge of the chip, i.e. a surface 19 which is substantially perpendicular to the face of the chip 17, by adhesive or solder so this adhesive joint interface is put under shear by forces tending to peel the fibre out of the V-groove and so substantially increases the resistance of the attachment to such forces.

The fibre 22 may be threaded through the disc 24 prior to attachment of the fibre or the disc to the chip. Once the fibre 22 has been positioned within the V-groove, the disc 24 can be slid along the fibre 22 until it engages the edge of the chip 17. In the orientation shown in the drawing, the disc 24 tends to hang on the fibre 22 so the upper surface of the fibre, i.e. that facing away from the face of the chip, is in contact with a wall of the aperture in the disc 24. If the disc 24 is affixed to the edge of the chip 17 in this position it holds the fibre 22 in place relative to the edge of the chip without any play therebetween, without exerting any significant pressure on the fibre itself and without deforming the fibre. The performance of this additional restraint is not therefore reliant on precise dimensions of the disc or of its aperture and as the disc effectively locates itself in the optimum position no precise alignment apparatus is required.

One side of the aperture 23 through the disc 24 is preferably provided with a lead-in 25 which facilitates threading of the fibre 22 through the disc 24 before the optical fibre 22 is positioned in the groove 18. The lead-in 25 may be of frusto-conical shape or may be provided by curved walls.

The circular disc 24 is conveniently a transparent corundum watchmaker's jewel with the lead-in 25 constituted by the oil-cup of the jewel. Such jewels are readily available commercially with a range of diameters of 0.8 to 1.5 mm, a range of thicknesses of 0.2 to 0.5 mm, and a range of aperture diameters of 80 to 300 thousandths of a millimetre. Consequently, the most appropriate size can be selected particularly in relation to the diameter of the optical fibre.

FIGS. 2A–2C show schematic diagrams further illustrating the attachment of the fibre 22 by means of a disc 24 attached to an edge 19 of the chip 17.

The disk is preferably affixed to the edge of the chip by a light cured adhesive, e.g. an epoxy or acrylate adhesive.

The use of a transparent jewel as the disc 24 also enables a rapid-setting UV-cured adhesive to be used for affixing the disc to the edge of the chip to facilitate a shorter assembly time compared with, say, a heat cured adhesive.

This also helps ensure that an adhesive joint is formed between the majority of the surface of the disc facing the edge of the chip rather than just between the edges of the joint therebetween (as would be the case if the disc were opaque to the curing radiation).

The other side of the disc 24 is also preferably provided with a recess 26 about the aperture 23 as shown in FIG. 3. This recess 26 provides a reservoir for adhesive 27. The adhesive 27 may be placed in the recess 26 prior to the disc 24 being located against the edge 19 of the chip 17. As mentioned above, the adhesive 27 secures the disc 24 to the edge 19 of the chip. In addition, adhesive from the reservoir provided in the recess 26 may migrate, e.g. by capillary action, into the V-groove 18 so as to secure the fibre 22 in the V-groove 18.

The use of the disc described above provides a significant improvement in the strength of the attachment of the fibre to the substrate. The attachment is, in use, subject to forces due to mishandling, vibration and thermal stresses which can all apply bending moments to the optical fibre which tend to lift or peel the optical fibre 22 out of the groove 18. The disc 24, being securely attached to the edge of the substrate, acts as a mechanical restraint resisting such bending moments and hence resisting movement of the optical fibre in a direction substantially perpendicular to the substrate. The result is a very robust attachment of the optical fibre relative to the edge of the chip.

In a modification of the embodiment described above, the disc 24 may be replaced by another form of mechanical restraint, e.g. a substantially U-shaped member which may be hung on the fibre in an inverted position with the legs of the "U" secured to the edge of the chip 17, and the base of the "U" resisting movement of the optical fibre in a direction substantially perpendicular to the chip.

As indicated above, the disc is preferably a watchmaker's jewel. This may be formed of corundum, ceramic, glass, synthetic ruby or other materials. However, it will be apparent that the disc may be of other form and be formed of other suitable materials. Other forms of mechanical constraint may be used, e.g. a square or hexagonal member with an aperture therethrough (and the aperture need not necessarily be circular) or a U-shaped member as described above.

The disc is preferably selected so as to have a thermal expansion coefficient substantially similar to that of the substrate to which it is affixed so as to reduce thermal stresses in the joint therebetween. It has been found that the thermal expansion coefficient ($7\times10^{-6}$ mm/mm/c) of corundum is sufficiently close to that of a silicon substrate ($2.5\times10^{-6}$ mm/mm/c) to avoid any undue problems in the temperature range $-40°$ C. to $+85°$ C.

What is claimed is:

1. An attachment of an optical fibre to a substantially planar substrate having a major face and an edge surface which is substantially perpendicular to the major face, the optical fibre being positioned within a groove provided in the major face of the substrate and extending over the edge of the substrate, a mechanical restraint being affixed to the edge surface of the substrate and in contact with at least a surface of the fibre opposite the major face of the substrate to resist movement of the optical fibre in a direction substantially perpendicular to and away from the major face.

2. An attachment according to claim 1 wherein the mechanical restraint is affixed to the edge surface of the substrate by adhesive.

3. An attachment according to claim 2 wherein the mechanical restraint is affixed to the edge surface of the substrate by a light-cured adhesive.

4. An attachment according to claim 1 in which the mechanical restraint has an aperture through which the optical fibre passes.

5. An attachment according to claim 4 wherein the mechanical restraint is a disc provided with the aperture through which the optical fibre passes.

6. An attachment according to claim 4 wherein the aperture is provided on a first side of the mechanical restraint facing away from the said edge with a lead-in to facilitate threading of the optical fibre through the aperture.

7. An attachment according to claim 4 wherein a recess is provided on a second side of the mechanical restraint facing the said edge to provide a reservoir for adhesive.

8. An attachment according to claim 1 wherein the mechanical restraint is made of ceramic.

9. An attachment according to claim 8 wherein the mechanical restraint is made of corundum.

10. An attachment according to claim 3 wherein the mechanical constraint is transparent.

11. An attachment according to claim 1 wherein the mechanical restraint is a watchmaker's jewel.

* * * * *